United States Patent
Glas et al.

(10) Patent No.: US 7,354,364 B2
(45) Date of Patent: Apr. 8, 2008

(54) APPARATUS FOR DETECTING THE SPEED OF AN ENDLESS TORQUE-TRANSMITTING MEMBER OF A CONTINUOUSLY VARIABLE TRANSMISSION

(75) Inventors: Ronald Glas, Achern (DE); Thomas Endler, Rheinmünster (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 360 days.

(21) Appl. No.: 10/731,890

(22) Filed: Dec. 9, 2003

(65) Prior Publication Data
US 2004/0142792 A1    Jul. 22, 2004

(30) Foreign Application Priority Data
Dec. 10, 2002    (DE) .............................. 102 57 576

(51) Int. Cl.
*F16H 7/18*    (2006.01)
*B62J 13/00*   (2006.01)

(52) U.S. Cl. ........................ 474/140; 474/144

(58) Field of Classification Search ............ 474/18, 474/28, 101, 102, 107, 110, 111, 140, 144, 474/146
See application file for complete search history.

(56) References Cited

U.S. PATENT DOCUMENTS

| | | | |
|---|---|---|---|
| 4,708,701 A * | 11/1987 | Cole, Jr. .................... 474/245 |
| 5,904,236 A * | 5/1999 | Affeldt et al. ........... 198/464.4 |
| 6,356,848 B1 * | 3/2002 | Cote et al. .................... 702/44 |
| 6,435,994 B1 * | 8/2002 | Friedmann et al. ......... 474/145 |

* cited by examiner

*Primary Examiner*—Richard Ridley
*Assistant Examiner*—James Pilkington
(74) *Attorney, Agent, or Firm*—Alfred J. Mangels

(57) ABSTRACT

A device for detecting the speed of an endless torque-transmitting member that passes around a pair of spaced conical pulley pairs of a continuously variable transmission. The device includes a sensor that is positioned adjacent the endless torque-transmitting member and that detects the speed of the endless torque-transmitting member at a point that is located relative to the movement course of the endless torque-transmitting member that is independent of the rotational speed relationship of the pulley pairs.

13 Claims, 2 Drawing Sheets

APPARATUS FOR DETECTING THE SPEED OF AN ENDLESS TORQUE-TRANSMITTING MEMBER OF A CONTINUOUSLY VARIABLE TRANSMISSION

BACKGROUND OF THE INVENTION

1. Field of the Invention

The present invention relates to apparatus for determining the speed of an endless torque-transmitting member of a continuously variable transmission.

2. Description of the Related Art

Conical pulley transmissions having an endless torque-transmitting means and for providing a continuous change of the transmission ratio are increasingly utilized as automatic transmissions in motor vehicles. FIG. 1 of the drawings is a schematic representation showing the basic structure of such a transmission.

A continuously variable transmission of the type shown in FIG. 1 includes two conical pulley pairs 4 and 6. One conical pulley disc $4_1$ of conical pulley pair 4 is rigidly connected with a drive shaft 8 that is driven by, for example, an internal combustion engine. The other conical pulley disc $4_2$ of conical pulley pair 4 is non-rotatably connected with but is axially moveable relative to drive shaft 8. One conical pulley disc $6_1$ of conical pulley pair 6 is rigidly connected with an output shaft 10 that drives the vehicle. The other conical pulley disc $6_2$ of conical pulley pair 6 is non-rotatably connected with but is axially moveable relative to output shaft 10. An endless torque-transmitting means 12 passes around the two conical pulley pairs 4 and 6 and is in frictional engagement with the opposed two conical surfaces of the respective conical pulley pairs. By means of opposite adjustment of the axial spacing between the two conical pulleys of each conical pulley pair, the rotational speed relationship between the two conical pulley pairs, and therefore the transmission ratio of the transmission, can be changed.

Pressure chambers 14 and 16 that are connected by way of hydraulic conduits 18 and 20 with a control valve 22 serve, for example, for the adjustment of the transmission ratio by the application to pressure chambers 14 and 16 of pressurized hydraulic fluid pressure, by which the transmission ratio can be controlled. A control unit 23 serves for the actuation of the control valve 22 and includes a microprocessor with associated storage means. Inputs for the control unit are connected, for example, with a selection lever unit that serves for operating the transmission, an accelerator pedal, rotational speed sensors, and the like. The outputs of the control unit are connected, for example, with a clutch, a power output stage of the engine (not shown) and control valve 22. The construction and function of a continuously variable transmission are known and are therefore not further explained.

For many applications it is advantageous to know the speed of endless torque-transmitting means 12, for example in order to precisely establish the contact pressure applied by the conical surfaces of the conical pulleys with which the endless torque-transmitting means is in contact, and which is controllable by the pressure in pressure chambers 14 and 16. That contact pressure should only be as large as necessary for acceptable frictional engagement or power flow between the endless torque-transmitting means and the conical pulleys, so that the transmission is not unnecessarily stressed and so that no unnecessary hydraulic pumping capacity is utilized.

SUMMARY OF THE INVENTION

An object of the invention is to provide apparatus having a simple structure and that works reliably to determine the speed of the endless torque-transmitting means of a continuously variable transmission.

That object is achieved with apparatus for the determination of the speed of the endless torque-transmitting means of a continuously variable transmission, which continuously variable transmission includes two conical pulley pairs rotatably situated on separate axes that are parallel to each other and having two spaced conical discs. The axial spacing of the conical discs can be changed in opposite directions for the purpose of changing the rotational speed relationship of the conical pulley pairs, so that an endless torque-transmitting means that passes around the conical pulley pairs moves independently of the respective transmission ratio and in frictional engagement with the conical surfaces of the conical pulleys. The apparatus includes a sensor that detects the speed of the endless torque-transmitting means in a position whose location relative to the movement path of the endless torque-transmitting means is independent of the rotational speed relationship of the conical pulley pairs.

The sensor is advantageously guided and brought into contact with a slack strand of the endless torque-transmitting means by a guide bar that is tiltable about an axis that is parallel to the axes of the conical pulley pairs.

The guide bar is advantageously located on an oil pipe that extends between the conical pulley pairs so that it is displaceable in a direction that is substantially perpendicular to the direction of movement of the endless torque-transmitting means and is stationary in the direction of movement of that element.

If the endless torque-transmitting means is a plate-link chain, the sensor advantageously detects the moving pins that interconnect individual links, the end faces of which pins are in frictional engagement with the conical surfaces. Preferably, the sensor is a proximity sensor that detects the end faces of the pins.

In a preferred embodiment of the apparatus in accordance with the invention the sensor is connected to a control unit in which data relative to the plate-link chain are stored, and which determines the speed of the plate-link chain by the number of the detected pins and by the time intervals between successive pins. Advantageously, the number of plate links of the plate-link chain and their lengths are stored in the control unit.

If the plate-link chain has different spacings between the pins, the control unit stores at least one of the different spacing between the pins and at least a number of equal, successive spacings, and the control unit determines the speed of the plate-link chain after detecting a number of equal, successive spacings.

The invention can be installed in all types of continuously variable transmissions having continuously variable transmission ratios.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
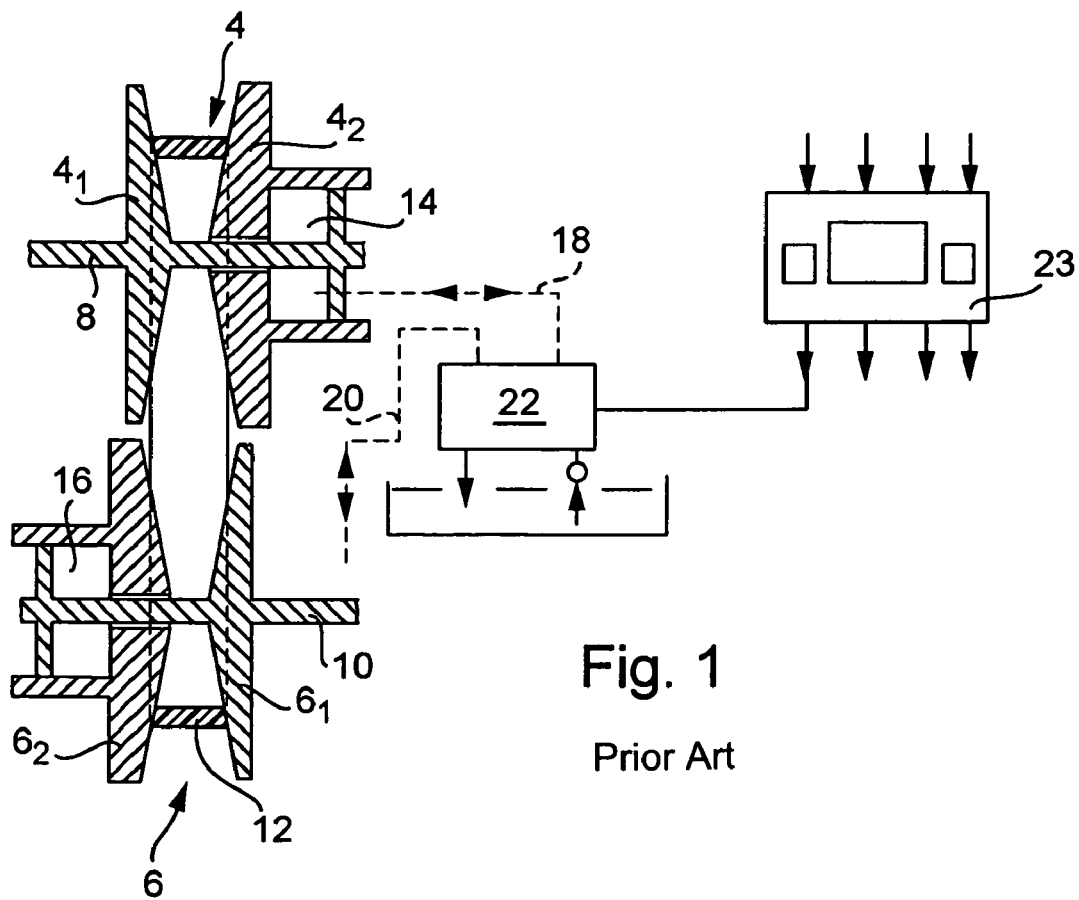
FIG. 1 is a schematic representation of a previously-described, known continuously variable transmission with an associated control unit.
Figure 2:
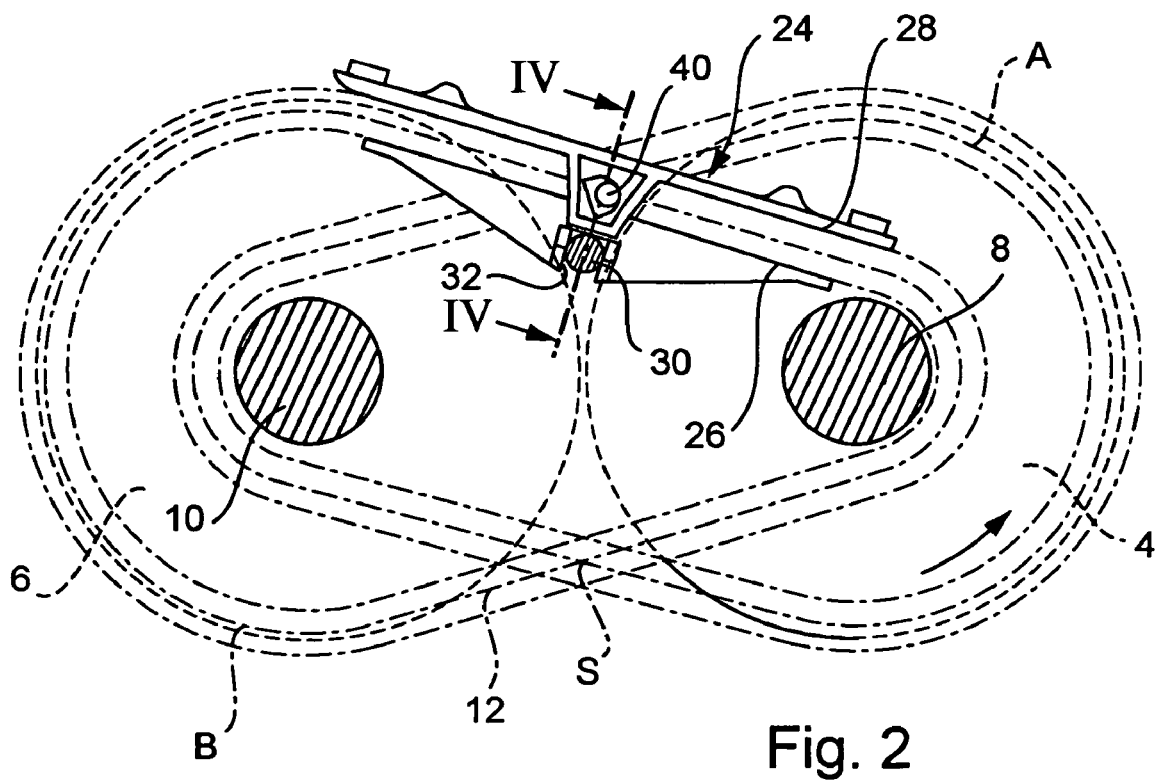
FIG. 2 is a cross-sectional view through the middle of a continuously variable transmission, perpendicular to the axes of the shafts.

FIG. 2 shows a cross-sectional view through the middle of a continuously variable transmission, perpendicular to the axes of the shafts 8 and 10. The slack strand of endless torque-transmitting means 12 is guided by a guide bar 24 which prevents undulations of the slack strand. In the illustrated embodiment, the rotational direction of the pulley pairs 4 and 6 is counterclockwise, and shaft 8 is the drive shaft that is driven by the motor. The continuously variable transmission or its endless torque-transmitting means 12, which are completely represented by dashed lines, are shown in two different positions. In position A, the spacing between the conical pulleys of conical pulley pair 4 is at a minimum and that between the conical pulleys of conical pulley pair 6 is at a maximum, so that the transmission operates at the highest possible transmission ratio. In the other position B, the transmission operates at the smallest possible transmission ratio, which means that the radius at which the endless torque-transmitting means travels on the conical pulley pair 4 is at a maximum.

As is apparent, the movement path of endless torque-transmitting means 12 changes continuously with the transmission ratio change, whereby the straight parts of the movement paths generally do not intersect at an intersection point S as shown, the position of which is fixed and independent of the rotational speed relationship or the transmission ratio (in FIG. 2 only the lower intersection point S is identified).

Guide bar 24 that guides endless torque-transmitting means 12 between an outer guideway 28 and an inner guideway 26 is carried on a fixed pivot in the form of a pin that is fastened to the transmission housing (not shown) or on an oil pipe 30. Guide bar 24 includes a U-shaped recess 32 whose opposite sidewalls are approximately perpendicular to the movement direction of the endless torque-transmitting means, or to the longitudinal direction of the guide bar, and is supported in such a way that it follows a change of the movement path of the endless torque-transmitting means 12 by pivoting on the outer surface of oil pipe 30 and by the shifting of the opposed walls of recess 32 relative to the oil pipe outer surface, so that its slack strand is continuously securely guided and is secured against any undulations. Oil pipe 30 has radial openings through which, and through corresponding openings at the bottom of recess 32, guide bar 24 is supplied with lubricant so that the endless torque-transmitting means is lubricated and is moveable along guide bar 24 with reduced friction.

Figure 3:
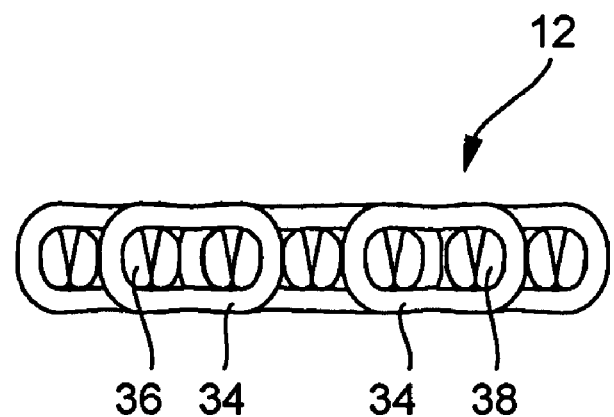
FIG. 3 is a side view of a portion of a plate-link chain.

Endless torque-transmitting means 12 is advantageously shown in the illustrated embodiment as a known plate-link chain, of which a portion is shown in FIG. 3. Such a plate-link chain is composed of several side-by-side rows of plate links 34 arranged in the movement direction of the plate-link chain, in which links 34 are arranged one behind another in the movement direction of the plate-link chain. The connection of the plate links is effected by pins 36 that pass laterally through the plate-link chain or through inner openings of the plate links, wherein the pins are composed of two rocker members the facing surfaces of which roll against each other when the chain assumes a curved form, and whose oppositely-facing surfaces serve as bearing surfaces for neighboring rows of the links and serve for longitudinally connecting the rows. Outer end faces 38 of pins 36, or the rocker member pairs, form the surfaces with which the plate-link chain is in a frictional engagement with the conical surfaces of the conical disk pairs.

A sensor 40 is securely fastened on guide bar 24 so that it detects end faces 38 of pins 36, or the rocker member pairs, that pass by, for detecting the linear speed of plate-link chain 12. Because guide bar 24 moves in correspondence with the change of the movement path of the plate-link chain, without moving along the movement direction of the chain, the position of the sensor remains constant relative to the movement path of the plate-link chain and is independent of the transmission ratio, so that the linear speed of the plate-link chain is reliably detected.

Advantageously, sensor 40 is mounted in the middle region of the guide bar, from which a connection conduit can be passed between the conical pulleys to the outside.

Figure 4:
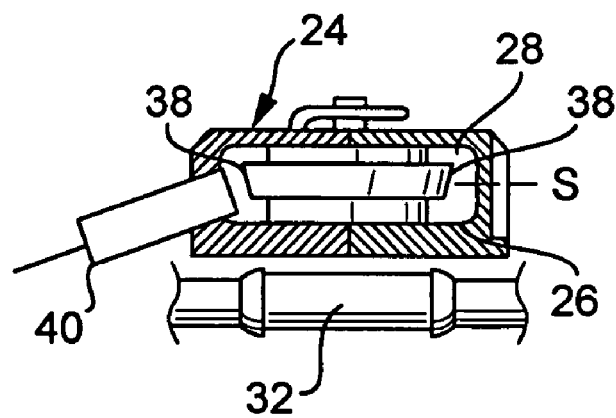
FIG. 4 is an enlarged, cross-sectional view taken along the line IV-IV of FIG. 2.

In FIG. 4, which shows a cross-section taken along line IV-IV of FIG. 2, sensor 40 is mounted on the side of guide bar 24 and extends into the interior thereof, where end faces 38 move along a sensor surface of sensor 40. Sensor 40 is, for example, an inductively functioning distance sensor, the inductance of which changes from time to time when the end faces move by, so that the time lapse or the number of the passing pins 36 can be detected. It is sufficient for resolution accuracy if the two end faces of a pair of rocker members are not detected individually, but are detected together as end faces of a single pin. If the distance between pins 36 and the time duration of the passing movement of two pins passing sensor 40 are known, the speed of the plate-link chain can be determined.

Figure 5:
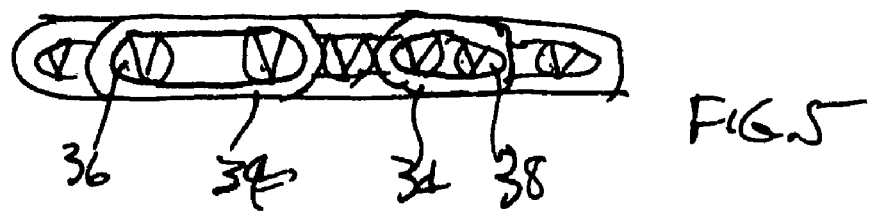
FIG. 5 is a view similar to FIG. 3 of a plate-link chain having differently spaced pin pairs.

In order to determine the speed of a so-called "random pitch" chain whose links have different lengths (see FIG. 5), so that the spacing between pins 36 varies, an algorithm for the detection of the pattern at which the spacing between pins 36 changes can be stored in a control unit connected with sensor 40, for example in control unit 23. For example, the pattern in which long and short links follow one another, or the quantity, is stored in control unit 23, so that by counting the number of successively following same pin spacings can be determined, whether it is a matter of short or long spacings. It should be understood that at least one more additional pin spacing must be evaluated than actually present equal pin spacings. After identifying whether it is a short or a long pin spacing, the speed of the plate-link chain can in turn be determined by forming a simple ratio from the pin spacing and the time interval in which the pins follow one another.

According to another evaluation type, as many pins can be counted as are contained in the chain, so that the speed can be determined from the length of the time needed and the chain length.

It should be understood that the algorithm can be changed in various ways.

The described structural arrangement can be changed in various ways. Sensor 40 can be cast in an opening in the guide bar, or can be glued. Sensor 40 can work in any suitable physical fashion. Sensor 40 can be fastened on a transmission housing of belt-driven transmissions whose conical surfaces have a form by which the junction S is stationary and independent of the transmission ratio, and the movement of the plate-link chain at point S can be determined through an opening in the guide bar. The data transmission from the sensor to an control unit can occur without contact.

Guide bar 24 does not necessarily have to guide the endless torque-transmitting means along its inner or outer side, but can, for example, guide it only along its inner side, and it can be urged outward elastically at its bearing.

In a further changed design, a touching wheel, for example a gear wheel or a friction wheel, can be arranged in such a way that it detects the movement of the endless torque-transmitting means about at the junction S, so that a direct mechanical sensing of the endless torque-transmitting means can take place at the stationary location of its movement path. This is especially advantageous if the endless torque-transmitting means is not formed as a plate-link chain, but is in the form of a band with a substantially level front- or backside. It should be understood that a plate-link chain can also be sensed from the outer or inner side.

In an advantageous way it is common to all embodiments of the invention that the endless torque-transmitting means is detected by the sensor at one position, the location of which is approximately constant relative to the endless torque-transmitting means and independent of the respective transmission ratio.

What is claimed is:

1. A device for detecting the speed of an endless torque-transmitting means of a continuously variable transmission that includes two conical pulley pairs rotatably carried on spaced parallel axes and around which the endless torque-transmitting means passes, wherein the axial spacing between respective conical disks defining the pulley pairs can be changed inversely so that the endless torque-transmitting means moves independently between each transmission ratio and is in frictional engagement with the conical surfaces of the conical disks, said device comprising: a sensor positioned opposite to and facing the endless torque-transmitting means for detecting the linear speed of the endless torque-transmitting means as it passes the sensor, wherein the endless torque-transmitting means is a plate-link chain that includes pins that interconnect adjacent chain links, and the sensor detects pins as they pass the sensor; wherein the sensor is located at a position relative to the path of movement of the endless torque-transmitting means that is independent of the rotational speed relationship of the conical pulley pairs and is connected to a control unit within which plate-link chain structural data are stored, and which determines the speed of the plate-link chain based upon the number of detected pins and time intervals between pin detections; and wherein the plate-link chain has different pin spacings wherein at least one of the different pin spacings and at least a number of successive pin spacings are stored in the control unit, and wherein the control unit determines the speed of the plate-link chain after receiving detected successive pin spacings.

2. A device according to claim 1, wherein the sensor is carried on a linear guide bar that guides a slack linear strand of the endless torque-transmitting means and that can pivot about an axis that is parallel to the axes of the conical pulley pairs.

3. A device according to claim 2, wherein the guide bar is carried on a fixed support positioned between the conical pulley pairs.

4. A device according to claim 2, wherein the fixed support is an oil pipe.

5. A device according to claim 2, wherein the guide bar is displaceable in a direction that is substantially perpendicular to the movement direction of the endless torque-transmitting means.

6. A device according to claim 2, wherein the pivot axis of the guide bar is positioned between the pulley axes and is within a loop defined by the endless torque-transmitting means.

7. A device according to claim 1, wherein the sensor is a proximity sensor that detects end faces of the pins.

8. A device according to claim 1, wherein the stored plate-link structural data include the number of pins carried by the plate-link chain and the spacing between pins.

9. A device according to claim 1, wherein end faces of the pins are in frictional engagement with the conical surfaces of the conical disks.

10. A continuously variable transmission including a device for detecting the speed of an endless torque-transmitting means, said transmission comprising: two conical pulley pairs rotatably carried on spaced parallel axes; an endless torque-transmitting means that passes around the conical pulley pairs to transmit torque therebetween; wherein the axial spacing between respective conical disks defining the pulley pairs can be changed inversely to change the transmission ratio of the transmission; wherein the endless torque-transmitting means is a chain that moves radially relative to the axes of rotation of the conical disk pairs and independently between each transmission ratio and includes a plurality of spaced pairs of parallel pins each extending parallel to the axes of the conical pulley pairs and having a predetermined spacing between successive pin pairs, the pin pairs having pin ends that frictionally engage conical surfaces of the conical disks during movement of the endless torque-transmitting means around the conical disk pairs; a guide bar pivotable about a pivot axis that is parallel to the axes of rotation of the conical disk pairs for linearly guiding the endless torque-transmitting means as it moves between the conical disk pairs, wherein the guide bar includes a passageway section defined by pairs of spaced walls that surround and enclose a portion of the chain as it moves along the guide bar to define a chain-receiving opening through which the chain passes as it moves between the conical disks; and a sensor carried by the guide bar at the passageway section and extending into the chain-receiving opening, wherein the sensor is positioned opposite to and facing the ends of the pin pairs of the endless torque-transmitting means for detecting end faces of the pin pairs as they pass the sensor during movement of the endless torque-transmitting means, wherein the sensor provides an output to a control unit in which data relative to spacings between ends of successive pin pairs are stored, whereby the linear speed of the endless torque-transmitting means is determined based upon the stored pin pair end face spacing and the pin pair end faces detected by the sensor as the ends of the pin pairs of the endless torque-transmitting means pass the sensor.

11. A continuously variable transmission according to claim 10, wherein the pin pairs of the endless torque-transmitting means are uniformly spaced from each other at a predetermined uniform spacing along the chain movement direction.

12. A continuously variable transmission according to claim 10, wherein the endless torque-transmitting means includes pin pairs that have different spacings between adjacent pin pairs, in addition to having pin pairs that are equally spaced from each other along the chain movement direction.

13. A continuously variable transmission according to claim 12, wherein the control unit has stored within it a number of equal, successive pin pair spacings for determining the linear speed of the endless torque-transmitting means based upon detection by the sensor of a number of pin pairs having at least one of the stored pin pair spacings.

* * * * *